United States Patent [19]

Sajbel

[11] Patent Number: 5,516,422
[45] Date of Patent: May 14, 1996

[54] INTERREACTOR PARTICLE TRANSFER PROCESS AND ARRANGEMENT

[75] Inventor: Patrick O. Sajbel, Mount Prospect, Ill.

[73] Assignee: UOP, Des Plaines, Ill.

[21] Appl. No.: 239,191

[22] Filed: May 6, 1994

[51] Int. Cl.⁶ .................................................. C10G 35/10
[52] U.S. Cl. .......................... 208/174; 208/173; 208/175
[58] Field of Search ................................. 208/173, 174, 208/175

[56] References Cited

U.S. PATENT DOCUMENTS

| | | | |
|---|---|---|---|
| 2,684,927 | 7/1954 | Bergstrom | 208/174 |
| 2,717,863 | 9/1955 | Evans | 208/174 |
| 2,769,672 | 11/1956 | Fahnestock | 302/53 |
| 2,772,216 | 11/1956 | Elliott | 208/173 |
| 2,868,721 | 1/1959 | Bergstrom | 208/174 |
| 2,878,076 | 3/1959 | Milliken, Jr. | 208/174 |
| 2,901,421 | 8/1959 | Bourguet et al. | 208/174 |
| 3,692,496 | 9/1972 | Greenwood et al. | 208/175 |
| 3,725,248 | 4/1973 | Greenwood et al. | 208/138 |
| 3,785,963 | 1/1974 | Boyd et al. | 208/173 |
| 3,839,196 | 10/1974 | Plackmann et al. | 208/174 |
| 3,839,197 | 10/1974 | Greenwood et al. | 208/174 |
| 5,338,440 | 8/1994 | Sechrist et al. | 208/174 |

Primary Examiner—E. Rollins Cross
Assistant Examiner—Walter D. Griffin
Attorney, Agent, or Firm—Thomas K. McBride; John G. Tolomei

[57] ABSTRACT

A process for transferring catalyst particles between multiple reactions zones simplifies the system for use of a single valve operation by passing a purge gas into a lower section of a reaction zone that discharges catalyst from the reaction zone into a lift vessel and uses the intermittent introduction of a lift gas stream to entrain catalyst particles in a dilute phase upward lift step to a succeeding reaction zone while simultaneously retarding the flow of catalyst particles down the discharge conduit and interrupting the flow of purge gas down the discharge conduit. In this manner a flow of purge gas can constantly enter the reaction zone supplying catalyst particles to the lift system thereby preventing any flow of reactants from the reactor into the lift system while only the addition of lift gas into the lift system needs to be cycled on and off to intermittently transfer the catalyst particles upwardly in dilute phase to the top of the next reaction zone. Therefore, the whole system can transfer catalyst particles indefinitely with the operation of only one valve that is not in catalyst service. As a result additional equipment such as disengagers, control valves and conduits for venting gas and interrupting catalyst flow is eliminated.

9 Claims, 1 Drawing Sheet

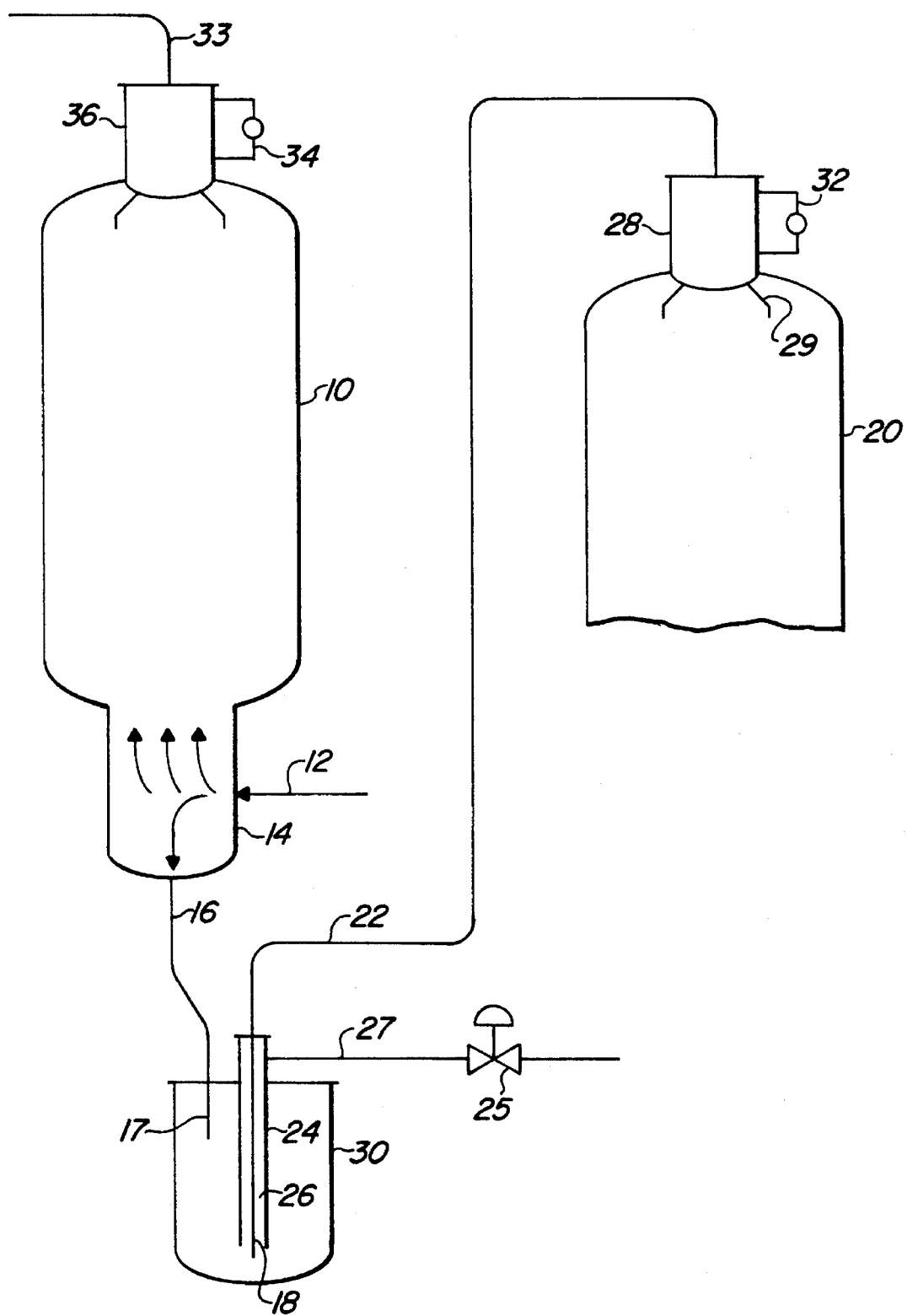

INTERREACTOR PARTICLE TRANSFER PROCESS AND ARRANGEMENT

FIELD OF THE INVENTION

This invention relates generally to methods for transferring particles. This invention relates more specifically to the intermittent vertical transport of particles from a first reaction zone to a second reaction zone.

DESCRIPTION OF THE PRIOR ART

Multi-stage reaction systems are well known in the petroleum and petrochemical industries for effecting chemical reactions in a multiplicity of stages. These multiple stages of the reaction system are defined by multiple reactors or reaction zones. The reactions can be of many types such as exothermic, endothermic, hydrogen producing, hydrogen consuming. In the case of exothermic or endothermic processes the multiple stages of reaction zones are typically employed to provide intermediate heating or cooling between the reaction zones. The types of reactions to which these systems have been applied in petroleum refining include catalytic reforming, alkylation, dehydrogenation, hydro-refining, isomerization, desulfurization, hydrocracking, hydrogenation etc. These reactions may be affected in vapor phase, liquid phase, or mixed phase conditions.

This invention applies to multi-stage reaction zones wherein each reaction zone contains particulate catalyst and catalyst is transferred between the reactions zones while the reactions are in progress through the reaction zones. The flow of reactants through each individual reaction zone may be cocurrent, countercurrent or, as more generally practiced, radial. Radial flow catalyst reactor systems are well known and typically comprise co-axially disposed catalyst retaining screens that retain the catalyst while permitting the reactants to through flow therethrough. In addition the screen sections usually define all or a portion of distribution and collection chambers for the entering and exiting reactants. These chambers usually have the configuration of an annular chamber to the outside of the screen sections and a central conduit surrounded by the screen sections.

Multi-stage reaction systems that transfer catalyst between on line reaction zones are arranged in two principal configurations. In one configuration, the catalytic reaction zones are located one above another in a stacked arrangement such that catalyst flows continually downward from the bottom of one reaction zone to the top of the next reaction zone without any lifting of the catalyst particles between reaction zones. The other principal configuration for multi-stage reaction zones places reaction zones in a side-by-side relationship wherein catalyst particles from the bottom of one reaction zone are lifted to the top of the next reaction zone. Therefore, while the catalyst particles move by gravity through each individual reaction zone, any side-by-side reaction zone arrangement requires a lifting of catalyst particles in order to enter the next reaction zone.

Systems for transferring catalyst from a side-by-side disposed multiple reaction zone system are known and shown in U.S. Pat. No. 3,839,197, the contents of which are hereby incorporated by reference. Systems such as these provide two functions. One function is to lift catalyst that has been discharged from the bottom of one reaction zone and transfer it to the top of a succeeding reaction zone that receives the discharged catalyst particles.

Another function of the system is to isolate the environments of the reaction zones. The isolation of the environments between the two reaction zones is usually important not so much to prevent mixing of reactants between the reaction zones, but to allow proper operation of the lift system. In a number of processes such as catalytic reforming, the feed stream comprises relatively heavy hydrocarbon. While undergoing processing, the reaction zones keep the feed and the resulting products at relatively high temperatures such that condensation of heavy hydrocarbons poses no problems within the reaction zone itself. However, the passage of these heavy hydrocarbons into a catalyst lift system can pose substantial problems. The catalyst lift system ordinarily operates at lower temperatures than the reaction zones from which the catalyst particles exit and to which the catalyst particles are transferred. Since the lift system is external from the reaction zones and, typically, operates only intermittently, the lift system has a substantially lower temperature than the reaction zones. At these lower temperatures, heavy hydrocarbons, if present, could condense to liquids thereby preventing or interfering with the catalyst transfer, and in particular the lifting operation. An alternative to preventing the heavy hydrocarbons from entering a cooler lift system would be to maintain the lift system at a higher temperature. Designing the lift system for higher temperatures and maintaining the lift system at higher temperatures would greatly increase the cost of such interreactor catalyst transfer systems, due to the amount of equipment and the complexity of the piping typically involved in most of these lift systems.

Accordingly, a typical prior an lift system will use a purge gas to inhibit reactants from entering the lift system. Accordingly, one element of the prior art lift systems is typically a purge gas.

A desired operational feature for the lift systems is a capability to operate between reaction zones that have only a small differential pressure. In many of the reaction systems, particularly reforming, it is desirable to operate the overall reaction zones at low pressure. Any pressure drop through the reaction system must be overcome by raising the pressure of the process. Where there are multiple reaction zones, the pressure drop for transferring reactants between the reaction zones is additive. Accordingly minimizing pressure drop between reactions zones is important when minimizing overall process pressures. Therefore, the reaction zones are typically operated with only the minimal pressure drop between reaction zones that is necessary for transfer piping and any equipment that heats or cools the reactants as they pass from one reactor to the next. Typically, such pressure drops between reactors will be less than 5 psi and, more typically, less than 3 psi. In order for the lift system not to interfere with the low pressure drop arrangement between reactors, the lift system must either operate at low differential pressures or be isolated during the lifting steps to prevent its operation from interfering with the pressure balance between reactors.

There are relatively simple systems for transferring catalyst particles between reaction zones. For example, it is well known to transfer catalyst under dense-phase conditions upwardly through a lift conduit in simple arrangement. This type of arrangement is shown in U.S. Pat. No. 2,769,762. Such systems do not meet the low pressure drop requirement since they require high pressure drops to move catalyst as a fluidized mass.

Providing the function of catalyst lift along with regulating purge gas while operating with low pressure drops between reaction zones has led to complicated lift systems for transfer of catalyst between reactors. Thus, known systems for catalyst transfer between reactors that meet all of the necessary constraints use multiple lines for delivery of a lift gas or purge gas as well as additional conduits for venting and gas disengagement. In addition, most of these lines contain valves for regulation the various gas stream. Furthermore known lift systems routinely requires the use of valves to regulate catalyst flow at some point in the operation of the lift system. Operating valves in catalyst service can lead to maintenance problems, particularly in view of the dusty environment associated with such service. Moreover the presence of multiple conduits and valves adds to the expense of the lift systems and detracts from its operation by raising the level of skill or control elements necessary for its operation.

SUMMARY OF THE INVENTION

It is an object of this invention to simplify the lifting of catalyst from one reaction zone to another reaction zone in an arrangement of multiple-reaction zones that operate at low differential pressure and employ a purge gas to prevent the entry of reactants into the lift system.

It is a further object of this invention to provide a lift system for inter-reactor transfer of catalyst particles that isolates the environments of the reaction zones from the lift system and requires the operation of only one control valve to effect a complete cycle of lifting steps.

This invention achieves these objectives by passing a purge gas into a lower section of a reaction zone that discharges catalyst from the reaction zone into a lift vessel and uses the intermittent introduction of a lift gas stream to entrain catalyst particles in a dilute phase upward lift step to a succeeding reaction zone while simultaneously retarding the flow of catalyst particles down the discharge conduit and interrupting the flow of purge gas down the discharge conduit. In this manner a flow of purge gas can constantly enter the reaction zone to prevent any flow of reactants into the lift system while only the addition of lift gas into the lift system needs to be cycled on and off to intermittently transfer the catalyst particles upwardly in dilute phase to the top of the next reaction zone. Therefore, the whole system can transfer catalyst particles indefinitely with the operation of only one valve that operates in gas service. As a result additional equipment, such as disengagers, control valves and conduits for venting gas and interrupting catalyst flow is eliminated. Moreover, the system can operate without any valves in catalyst service.

This invention is particularly useful for arrangements wherein there is a very low pressure drop between the reactors that supply and receive catalyst from the lift system. Preferably, the pressure difference between the reaction zones will vary by no more than 10 psi and, more preferably, by less than 5 psi.

The purge gas and lift gas arrangement of this invention also provides a continuous purge throughout the operation of the lift system. Purge gas flows to the bottom of the reactor supplying catalyst particles continuously during all operational conditions of the lift system. A portion of the lift stream continually flows up through the reactor supplying particles to the lift system and constantly purges the bottom of the reactor to prevent any flow of reactor fluids into the lift system. Except during the lift step a portion of the purge gas also flows into the downstream reactor that receives the particles thereby preventing any backflow of reactor fluids from the downstream reactor. When the lift system lifts particles into the downstream reactor, a large portion of the lift gas flows into the downstream reactor to prevent backflow of reactor fluids from the downstream reactor while at the same time a lesser portion of the lift fluid flows into the upstream reactor and assists the purge gas in the purge of reactor fluids.

Accordingly in one embodiment this invention is a process for transferring catalyst particles between reaction zones in a multi-stage catalytic reaction system wherein a hydrocarbon reactant stream flows serially through a plurality of reaction zones and catalyst particles flow from the bottom of a reaction zone discharging catalyst, upwardly to the top of a reaction zone receiving catalyst. The process passes a purge gas into the bottom of a first reaction zone and upwardly into the first reaction zone. Catalyst intermittently flows from the bottom of the first reaction zone downwardly through a discharge conduit into a lift vessel while a portion of the purge gas passes downwardly through catalyst in the discharge conduit into the lift vessel and upwardly from the lift vessel through a lift conduit to a second reaction zone. Discharge of catalyst particles from the discharge conduit into the lift vessel continues at least until catalyst particles contact the bottom of the discharge conduit. At selected intervals a flow of lift gas enters the lift vessel and lifts catalyst from the lift vessel into the lift conduit by entraining catalyst particles with the flow of lift gas up the lift conduit to transfer catalyst particles to the second reaction zone under dilute phase flow conditions. During the lifting step, a portion of the lift gas flows up the discharge conduit to retard the downward flow of catalyst through the discharge conduit and to interrupt the flow of purge gas down the discharge conduit. Discontinuing the flow of the lift gas to the lift vessel again promotes the discharge of catalyst from the first reaction zone through the discharge conduit.

Other objects, embodiments, and details of this invention are disclosed in the following detailed description of the invention.

BRIEF DESCRIPTION OF THE DRAWING

The drawing is a schematic representation of two reaction zones from which particulate material is transferred by the process of this invention. The drawing is presented as an extremely simplified schematic flow diagram in which only those lines, valves, etc. relevant to the flow of catalyst particles are shown.

DETAILED DESCRIPTION OF THE INVENTION

The process of this invention can be applied to any system wherein particulate material requires vertical transport of particulate material from one vessel to another and isolation of the environment between the transport system and the vessels. Particulate material suitable for use in this invention will normally comprise geometric shapes of regular size. The maximum dimension of the particulate material will be substantially less than the conduits used for conveyance and transport of the particulate material. In most cases the particles will have a maximum dimension of less than ½ inch. The most preferred type of particulate material to which this invention is applied in hydrocarbon conversion processes.

The most widely practiced hydrocarbon conversion process to which the present invention is applicable is catalytic reforming. Therefore, the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha. A naptha feedstock can be defined within a broad range of boiling point conditions and includes initial boiling points of about 100° F. (40° C.) to about 180° F. (80° C.) and end boiling points of about 350° F. (180° C.) to about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions. The more desired reactions are usually enhanced by lower operating pressures.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information of reforming processes may be found in, for example, U.S. Pat. Nos. 4,119,526 (Peters el al.); 4,409,095 (Peters); and 4,440,626 (Winter et at), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about 1/16th to about 1/8th inch (1.5–3.1 mm), though they may be as large as 1/4th inch (6.35 mm). In a particular reaction-regeneration system, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

The present invention is applicable to a moving bed reaction system. Fresh catalyst particles are fed to the reaction system, which is comprised of several reaction zones. The particles flow through each reaction zone by gravity and are lifted between reaction zones in accordance with the process of this invention. Catalyst is withdrawn from the bottom of the last reaction zone in the series and transported to a regeneration zone where a multi-step regeneration process is used to remove the coke deposits and recondition the catalyst to restore its full reaction promoting ability. The an of moving bed regeneration zones is well known and does not require detailed description herein. Catalyst flows by gravity through the various regeneration steps and then is withdrawn from the regeneration zone and furnished to the first reaction zone in the reaction system. Catalyst that is withdrawn from the regeneration zone is termed regenerated catalyst. Movement of catalyst through the zones is often referred to as continuous through, in practice, it may be semi-continuous. By semi-continuous movement is meant the repeated transfer of relatively small mounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The simplified catalyst lifting method for transferring particulate material through multiple zones operates with three basic steps. These steps include a filling step that transfers catalyst from a reaction zone into a lift vessel, a standby step in which no catalyst transfer takes place and a lift step during which time catalyst flows upwardly from the lift vessel into a succeeding vessel.

In the first step, referred to as the standby condition, a lift vessel has been filled with catalyst and is ready for the lift step to begin. In the standby condition, a fraction of the purge gas that is entering an upstream reaction zone flows downward through a catalyst filled pipe into the lift vessel through a discharge conduit. The fraction of purge gas entering the lift vessel passes out of the lifting vessel through the lift line and into a downstream reactor. The lift line remains open and unobstructed throughout the standby step so that any portion of the purge gas entering the lifting vessel can freely flow into the downstream reactor. (Where the term a portion is used to describe either the purge fluid or the lift fluid, portion is generally meant to refer to an aliquot portion of that stream.) Only a relatively small fraction of the purge gas flows downwardly through the discharge conduit and into the lift vessel while the remainder of the purge gas follows the path of less frictional resistance and flows upwardly into the upstream reactor. The upward flow of purge gas through the reactor vessel strips reactor vapors, that could condense under conditions in the lift system, from the catalyst to prevent their flowing with the catalyst into the lift vessel. The purge fluid stream can flow into the bottom of the reactor at a relatively constant rate throughout the different conditions of operation. In this manner the addition of purge fluid does not require any separate control and does not interfere with the lift step.

In order to transfer catalyst from the lift vessel to the downstream reactor, the lift step is initiated. The lift step can be initiated at selected intervals or in response to any control system or indicator that shows a need to transfer catalyst. Preferably, the lift step will be initiated in response to a catalyst level measurement in either the upstream or downstream reactor. Passing a stream of lift gas into the lift vessel initiates the lift step and begins the pneumatic conveyance of catalyst to the top of the downstream reactor. During the lift step, the pressure in the lift vessel is higher than the pressure in the upstream reaction zone to inhibit the gravity flow of catalyst particles downwardly through the discharge conduit. The discharge conduit from the upstream reactor to the lift vessel is kept full of catalyst to maintain a restriction of the lift gas flow up the conduit. The restriction to gas flow offered by catalyst in the discharge conduit maintains the pressure differential between the vessels. By keeping the discharge conduit full of catalyst to act as a restriction to gas flow, a pressure differential between the reaction zones is maintained. During the lift step, catalyst particles flow through the lift line in a dilute phase flow. Dilute phase flow refers to the entrainment of catalyst particles such that the frictional drag of gas flow around the particles provides sufficient lift to raise the particles through the lift line without interparticle contact. In accordance with this invention, conveying the catalyst up the lift conduit under dilute phase conditions generates a pressure drop up the lift conduit that is generally less than 10 psi and more preferably less than 7 psi. The pressure drop through the lift conduit normally exceeds the pressure drop between the reactor between which it transfers catalyst. Dilute phase conditions are generally characterized by an apparent bulk density in the lift conduit of less than 20 lbs/ft$^3$ and, more typically, less than 10 lbs/ft$^3$. The actual apparent density of the catalyst within the lift conduit will vary and will be dependent on a number of factors, in particular, the density of the lift fluid and the velocity of the lift fluid through the conduit. Suitable lift fluids and purge fluids for this invention are any fluid that is compatible with the physical requirements of the lift system and reactor environments and in particular any fluid that will not condense in the lift system. In its preferred operation, the lift fluid of this invention will have a molecular weight of from 2–4 and will pass through the lift conduit at a superficial velocity of from 20–40 ft/sec. Preferably, both the purge fluid and lift fluid are gaseous and comprise hydrogen. With respect to many hydrocarbon conversion processes, these streams will be available as a portion of the hydrogen-rich recycled gaseous phase separated from a product effluent.

The lift step continues until the lift fluid has carried essentially all of the catalyst particles from the lift vessel and has cleared the lift conduit of catalyst. When all of the catalyst particles have been transferred to the top of the downstream reactor, the flow of lift fluid stops and the system enters a fill step. Once the flow of lift fluid stops, pressure in the lift vessel decreases to a value less than that in the upstream reactor. Catalyst particles then begin flowing downwardly from the upstream reactor through the discharge conduit under the assistance of pressure from the purge gas that again flows downwardly through the discharge conduit. The flow of catalyst out of the upstream reactor and through the discharge conduit continues until the catalyst particles reach the a predetermined level in the lift vessel. This level usually coincides with the bottom of the conduit that extends into the lift vessel. Once catalyst fills the lift vessel to the bottom of discharge conduit, frictional resistance of the particles prevents further withdrawal of catalyst from the upstream reactor vessel. Once the flow of catalyst particles stops, the lift system is again in the previously described standby condition.

A further understanding of the invention is provided in reference to the drawing. The drawing shows an upstream reactor 10, an upper portion of a downstream reactor 20 and a lift vessel 30. A stream of purge fluid 12 enters a purge chamber 14 at the bottom of reactor 10. The majority of the purge fluid flows upwardly into the reactor vessel 10 and typically flows outwardly from the reactor vessel 10 with the reaction products through an outlet (not shown). The remaining portion of the purge gas flows downwardly through a discharge conduit 16 and into lift vessel 30. For purposes of this drawing description, reactor 10 operates at a pressure about 3 psi higher than the pressure of reactor 20. This 3 psi differential pressure is representative of the minimum pressure that is needed to pass reactors from one reactor through the typical transfer piping and heat exchange equipment before entering the next reactor. The 3 psi differential pressure also provides a pressure assist to discharge catalyst through discharge conduit 16 into lift vessel 30. The flow of purge medium through discharge conduit 16 continues at a substantially constant rate throughout the catalyst fill, lift and standby conditions.

The drawing depicts a lower portion 18 of lift conduit 22 that extends vertically through the center of lift vessel 30. A concentric center pipe 24 surrounds the portion 18 of the lift conduit in lift vessel 30. The center pipe and lower lift conduit portion 18 define an annular annulus 26.

The lift condition commences with the opening of valve 25 to introduce lift fluid into the top of annulus 26 via a line 27. At commencement of the lift condition, the stream of the lift fluid flows downwardly through an annular space 26 defined between conduit 24 and conduit portion 18. Lift fluid from annulus 26 exits the lift vessel through the bottom of conduit 18 and causes catalyst particles to be lifted from the lower portion of lift vessel 30 upwardly through lift conduit 22. Catalyst particles, which normally occupy about 10% or less of lift conduit 22 when the system is in the lift condition, flow into a distribution chamber 28 at the top of reactor vessel 20. Throughout the lifting condition, the transfer of catalyst particles through lift conduit 22 under dilute phase conditions produces a pressure drop across conduit 22 of approximately 5 psi. The 5 psi pressure drop across lift conduit 22 exceeds the 3 psi pressure differential going from reactor 10 to reactor 20. Accordingly, there is about a 2 psi pressure differential along the path from lift vessel 30 to reactor vessel 10. This 2 psi pressure differential is sufficient to cause lift fluid to flow upwardly through discharge conduit 16 and prevent the downward flow of catalyst particles out through the bottom 17 of the discharge conduit. While the change in differential pressure is enough to retard the flow of catalyst particles out of discharge conduit 16, it is insufficient to reverse the flow of catalyst particles and effect an upward flow of catalyst out of discharge conduit 16 or a fluidization of catalyst particles within reactor 10.

The lifting of catalyst particles in dilute phase conditions through conduit 22 permits transfer of catalyst particles from lift vessel 30 to downstream reactor 20 with a relatively low pressure drop. As a result of the only minor change in pressure differential between lift vessel 30 and reactor vessel 10, a relatively short length of catalyst particles through conduit 16 can prevent a reversal of catalyst particle flow therethrough. As a result, a relatively close pressure differential between reactor 10 and 20 is possible without the use of a long length of discharge conduit to prevent reversal. Therefore as depicted schematically in the drawing the discharge conduit 16 will normally have a length that is less than the height of either reactors 10 or 20 and typically much less than half the height of either reactor.

Catalyst from lift line 22 that enters reactor 20 via distribution chamber 28 will typically flow through a plurality of pipes 29. Pipes 29 redistribute catalyst as it exits distribution chamber 28 so that the catalyst will flow evenly into screens or other catalyst retaining devices (not shown) that are normally located within reactor 20.

Following the evacuation of catalyst from lift vessel 30, catalyst starts to clear lift line 22. Lift line 22 becomes cleared of catalyst starting from the bottom up. Once the lift line is cleared of catalyst, the pressure differential between lift vessel 30 and reactor 20 approaches zero.

The fill step starts once the inventory of catalyst in lift vessel 30 has been depleted by closing valve 25 to stop the flow of lift fluid into lift vessel 30. As the pressure in lift vessel 30 decreases, pressure misted filling of lift vessel 30 from conduit 17 again begins. Catalyst filling continues until catalyst has again reached the bottom 17 of discharge conduit 16 and the lift system again remains in a standby condition.

In the preferred arrangement of this invention, the addition of lift fluid and the initiation of the lift step occur in response to a catalyst level reading in the distribution chamber. The initiation of the lift condition may start in response to a low level reading from a level indicator 32 on distribution chamber 28 in the downstream vessel 20 or a high level reading from a level indicator 34 in a distribution chamber 36 located at the top of reactor vessel 10.

After catalyst has been withdrawn from the bottom of reactor 10 the supply of catalyst to reactor 10 is replenished via a conduit 33. Conduit 30 supplies catalyst particles to a distribution chamber 36 in the manner previously described for reactor 20. Conduit 33 may receive catalyst particles from an upstream reactor which may operate with a transport system identical to that which has been described with respect to the transfer of catalyst particles from reactors 10–20.

What is claimed is:

1. A process for transferring catalyst particles between reactors in a multi-stage catalytic reactor system wherein a hydrocarbon reactant stream flows serially through a plurality of reaction zones and catalyst particles flow from the bottom of a reaction zone discharging catalyst upwardly to the top of a reaction zone receiving catalyst, said process comprising:

a) passing a purge gas into the bottom of a first reaction zone and upwardly into said first reaction zone;

b) intermittently withdrawing catalyst from the bottom of said first reaction zone downwardly through a discharge conduit, passing a portion of said purge gas downwardly through catalyst in said discharge conduit into a lift vessel passing purge gas from said lift vessel upwardly through a lift conduit to a second reaction zone and discharging catalyst particles from said discharge conduit into said lift vessel at least until catalyst particles contact the bottom of said discharge conduit;

c) intermittently passing a lift gas into said lift vessel, passing a portion of said lift gas up said lift conduit into said second reaction zone, entraining catalyst particles with said flow of lift gas up said lift conduit to transfer catalyst particles from said lift vessel to said second reaction zone under dilute phase conditions, passing a portion of said lift gas up said discharge conduit to retard catalyst flow downwardly through said discharge conduit and to interrupt any flow of purge gas down said discharge conduit; and, d) terminating the flow of said lift gas to said lift vessel to initiate the withdrawal of catalyst from said first reaction zone under step b.

2. The process of claim 1 wherein said lift conduit extends into said lift vessel, an outer conduit surrounds at least a portion of said lift conduit in said lift vessel to form an annulus and said lift gas enters said annulus.

3. The process of claim 1 wherein said purge gas is introduced at a substantially constant rate while intermittently adding lift gas and terminating the flow of lift gas to said lift vessel.

4. The process of claim 1 wherein the pressure drop across said lift conduit is less than 10 psi.

5. The process of claim 1 wherein the difference in pressure between said first reaction zone and said second reaction zone is less than the pressure drop across said lift conduit.

6. The process of claim 1 wherein said purge gas enters a purge chamber at the bottom of said first reaction zone.

7. The process of claim 1 wherein said purge gas comprises hydrogen.

8. The process of claim 1 wherein the lifting of catalyst from said lift vessel and the filling of catalyst into said lift vessel is controlled with a single valve.

9. A process for transferring catalyst particles between reactors in a multi-stage catalytic reactor system wherein a hydrocarbon reactant stream flows serially through a plurality of reaction zones and catalyst particles flow from the bottom of a reaction zone discharging catalyst upwardly to the top of a reaction zone receiving catalyst, said process comprising:

a) passing a purge gas at a substantially constant rate into a purge chamber located at the bottom of a first reaction zone upwardly into said first reaction zone;

b) intermittently withdrawing catalyst from the bottom of said first reaction zone downwardly through a discharge conduit, passing a portion of said purge gas downwardly through catalyst in said discharge conduit into a lift vessel, passing purge gas from said lift vessel upwardly through a lift conduit to a second reaction zone and discharging catalyst particles from said discharge conduit into said lift vessel at least until catalyst particles contact the bottom of said discharge conduit;

c) intermittently increasing the flow of a lift gas into said lift vessel, from a first rate to a second, passing a portion of said lift gas up said lift conduit into said second reaction zone, entraining catalyst particles with said flow of lift gas up said lift conduit to transfer catalyst particles from said lift vessel to said second reaction zone under dilute phase conditions, passing a portion of said lift gas up said discharge conduit to retard catalyst flow downwardly through said discharge conduit and to interrupt any flow of purge gas down said discharge conduit; and, d) decreasing the flow of said lift gas to said lift vessel to said first rate to initiate the withdrawal of catalyst from said first reaction zone under step b.

* * * * *